US007677315B2

(12) United States Patent
Saini et al.

(10) Patent No.: US 7,677,315 B2
(45) Date of Patent: Mar. 16, 2010

(54) DEGRADABLE SURFACTANTS AND METHODS FOR USE

(75) Inventors: Rajesh K. Saini, Duncan, OK (US); Bradley L. Todd, Duncan, OK (US); Michael N. Mang, Eden Prairie, MN (US)

(73) Assignee: Halliburton Energy Services, Inc., Duncan, OK (US)

( * ) Notice: Subject to any disclaimer, the term of this patent is extended or adjusted under 35 U.S.C. 154(b) by 345 days.

(21) Appl. No.: 11/244,345

(22) Filed: Oct. 5, 2005

(65) Prior Publication Data

US 2006/0254774 A1 Nov. 16, 2006

Related U.S. Application Data

(63) Continuation-in-part of application No. 11/128,060, filed on May 12, 2005.

(51) Int. Cl.
*E21B 43/26* (2006.01)
(52) U.S. Cl. ............... 166/308.1; 166/308.2; 166/308.6
(58) Field of Classification Search .............. 166/308.1, 166/308.2, 308.6
See application file for complete search history.

(56) References Cited

U.S. PATENT DOCUMENTS

| 2,238,671 | A | 4/1941 | Woodhouse ................. 166/21 |
| 2,703,316 | A | 3/1955 | Palmer ...................... 260/78.3 |
| 3,272,650 | A | 9/1966 | MacVittie ...................... 134/7 |
| 3,784,585 | A | 1/1974 | Schmitt et al. .............. 260/861 |
| 3,819,525 | A | 6/1974 | Hattenbrun ................. 139/139 |
| 3,828,854 | A | 8/1974 | Templeton et al. .......... 307/307 |
| 3,868,998 | A | 3/1975 | Lybarger et al. ............. 166/278 |
| 3,912,692 | A | 10/1975 | Casey et al. ................. 528/354 |
| 3,948,672 | A | 4/1976 | Harnsberger ................ 106/720 |
| 3,955,993 | A | 5/1976 | Curtice et al. .............. 106/662 |
| 3,960,736 | A | 6/1976 | Free et al. .................... 507/216 |
| 3,998,272 | A | 12/1976 | Maly ........................... 166/281 |
| 4,034,811 | A | 7/1977 | Sparlin et al. ............... 166/295 |
| 4,062,814 | A | 12/1977 | Hansen ....................... 252/529 |
| 4,169,798 | A | 10/1979 | DeMartino .................. 507/201 |
| 4,172,066 | A | 10/1979 | Zweigle et al. .............. 523/223 |
| 4,206,074 | A | 6/1980 | Perner ......................... 252/351 |
| 4,261,421 | A | 4/1981 | Watanabe .................... 166/281 |
| 4,360,451 | A | 11/1982 | Schmolka .................... 252/316 |
| 4,387,769 | A | 6/1983 | Erbstoesser et al. .......... 507/219 |
| 4,460,052 | A | 7/1984 | Gockel ......................... 175/72 |
| 4,464,203 | A | 8/1984 | Belde et al. .................. 106/308 |
| 4,470,915 | A | 9/1984 | Conway ...................... 507/211 |
| 4,476,107 | A | 10/1984 | Schmolka .................... 424/49 |
| 4,498,995 | A | 2/1985 | Gockel ......................... 507/100 |
| 4,526,695 | A | 7/1985 | Erbstoesser et al. .......... 507/219 |
| 4,595,513 | A | 6/1986 | Morgenthaler et al. ..... 252/8.55 |
| 4,634,039 | A | 1/1987 | Banerjee ..................... 228/118 |
| 4,668,430 | A | 5/1987 | Schmolka .................... 252/522 |
| 4,683,953 | A | 8/1987 | Eustace et al. ............... 166/294 |
| 4,694,905 | A | 9/1987 | Armbruster ................. 166/280.2 |
| 4,715,967 | A | 12/1987 | Bellis et al. .................. 507/219 |
| 4,716,964 | A | 1/1988 | Erbstoesser et al. ......... 166/284 |
| 4,745,160 | A | 5/1988 | Churchill et al. ............ 525/415 |
| 4,785,884 | A | 11/1988 | Armbruster ................. 166/280.2 |
| 4,797,262 | A | 1/1989 | Dewitz ........................ 422/142 |
| 4,809,783 | A | 3/1989 | Hollenbeck et al. ......... 166/307 |
| 4,817,721 | A | 4/1989 | Pober ........................... 166/295 |
| 4,843,118 | A | 6/1989 | Lai et al. ..................... 524/555 |
| 4,848,467 | A | 7/1989 | Cantu et al. ................. 166/281 |
| 4,886,354 | A | 12/1989 | Welch et al. .................. 356/70 |
| 4,904,466 | A | 2/1990 | Carson et al. ............... 424/76.3 |
| 4,957,165 | A | 9/1990 | Cantu et al. ................. 166/295 |
| 4,961,466 | A | 10/1990 | Himes et al. ............... 166/308.5 |
| 4,986,353 | A | 1/1991 | Clark et al. ................. 166/279 |
| 4,986,355 | A | 1/1991 | Casad et al. ................. 166/295 |
| 4,986,654 | A | 1/1991 | Meijer et al. .................. 356/43 |
| 5,082,056 | A | 1/1992 | Tackett ........................ 166/295 |
| 5,142,023 | A | 8/1992 | Gruber et al. ............... 528/354 |
| 5,152,933 | A | 10/1992 | Holland ....................... 252/559 |
| 5,216,050 | A | 6/1993 | Sinclair ....................... 524/108 |
| 5,247,059 | A | 9/1993 | Gruber et al. ............... 528/354 |
| 5,249,628 | A | 10/1993 | Surjaatmadia ........... 166/308.1 |

(Continued)

FOREIGN PATENT DOCUMENTS

| EP | 0338396 A3 | 4/1989 |
| EP | 0510762 | 10/1992 |
| EP | 0720511 B1 | 9/1994 |
| EP | 0687720 A3 | 6/1995 |
| EP | 0707041 A1 | 10/1995 |
| EP | 0747072 B1 | 5/1996 |
| EP | 0870781 A1 | 3/1998 |
| EP | 0894949 A1 | 7/1998 |
| EP | 0879935 A2 | 11/1998 |
| EP | 0879935 A3 | 2/1999 |

(Continued)

OTHER PUBLICATIONS

Search Report and Written Opinion of International Application No. PCT/GB2006/003575 Filed on Sep. 26, 2006 and date of mailing Mar. 5, 2007.
Hoffman et al.; "Flow Birefringence and Rheological measurements on Viscoelastic Detergent Solutions"; Lehrstuhl fur Physikalische Chemie der Universitat Bayreuth 30, pp. 237-250, May 1997.

(Continued)

*Primary Examiner*—David J Bagnell
*Assistant Examiner*—Nicole A Coy
(74) *Attorney, Agent, or Firm*—Robert A. Kent; Baker Botts LLP

(57) ABSTRACT

The present invention provides a method of generating an acid downhole that comprise providing a degradable surfactant; introducing the degradable surfactant into a well bore that penetrates a subterranean formation; and allowing at least a portion of the degradable surfactant to degrade, thereby releasing an acid. Also provided are methods of degrading an acid-soluble component present within a subterranean formation, and methods of reducing the viscosity of a viscosified treatment fluid.

33 Claims, No Drawings

U.S. PATENT DOCUMENTS

| | | | |
|---|---|---|---|
| 5,295,542 A | 3/1994 | Cole et al. | 166/278 |
| 5,320,647 A | 6/1994 | Henning et al. | 8/437 |
| 5,324,354 A | 6/1994 | Jesse et al. | 106/413 |
| 5,325,923 A | 7/1994 | Surjaatmadja et al. | 166/308.1 |
| 5,330,005 A | 7/1994 | Card et al. | 166/280.2 |
| 5,342,550 A | 8/1994 | Burke et al. | 252/548 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308.1 |
| 5,402,846 A | 4/1995 | Jennings et al. | 166/259 |
| 5,429,826 A | 7/1995 | Nair et al. | 424/501 |
| 5,439,055 A | 8/1995 | Card et al. | 166/280.2 |
| 5,460,226 A | 10/1995 | Lawson et al. | 166/300 |
| 5,464,060 A | 11/1995 | Hale et al. | 166/293 |
| 5,466,762 A | 11/1995 | Kroner et al. | 525/472 |
| 5,470,510 A | 11/1995 | Willey et al. | 252/546 |
| 5,475,080 A | 12/1995 | Gruber et al. | 528/354 |
| 5,484,881 A | 1/1996 | Gruber et al. | 528/354 |
| 5,497,830 A | 3/1996 | Boles et al. | 166/300 |
| 5,499,678 A | 3/1996 | Surjaatmadja et al. | 166/298 |
| 5,505,787 A | 4/1996 | Yamaguchi | 134/4 |
| 5,512,071 A | 4/1996 | Yam et al. | 51/307 |
| 5,516,452 A | 5/1996 | Welch et al. | 252/174.22 |
| 5,518,648 A | 5/1996 | Welch et al. | 252/174.22 |
| 5,525,657 A | 6/1996 | Anchor et al. | 524/261 |
| 5,525,702 A | 6/1996 | Nace | 528/354 |
| 5,536,807 A | 7/1996 | Gruber et al. | 528/354 |
| 5,591,700 A | 1/1997 | Harris et al. | 507/214 |
| 5,594,095 A | 1/1997 | Gruber et al. | 528/354 |
| 5,604,186 A | 2/1997 | Hunt et al. | 507/204 |
| 5,607,905 A | 3/1997 | Dobson et al. | 507/211 |
| 5,670,473 A | 9/1997 | Scepanski | 510/445 |
| 5,695,813 A | 12/1997 | Anchor et al. | 427/180 |
| 5,698,322 A | 12/1997 | Tsai et al. | 428/373 |
| 5,765,642 A | 6/1998 | Surjaatmadja | 166/297 |
| 5,791,415 A | 8/1998 | Nguyen et al. | 166/280.1 |
| 5,833,000 A | 11/1998 | Weaver et al. | 166/276 |
| 5,837,098 A | 11/1998 | Li et al. | 162/5 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,919,434 A | 7/1999 | Dugstad et al. | 424/9.52 |
| 5,924,488 A | 7/1999 | Nguyen et al. | 166/280.1 |
| 5,964,291 A | 10/1999 | Bourne et al. | 166/279 |
| 5,965,509 A | 10/1999 | Welch et al. | 510/365 |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,114,410 A | 9/2000 | Betzold | 523/130 |
| 6,123,965 A | 9/2000 | Jacob et al. | 424/489 |
| 6,131,661 A | 10/2000 | Conner et al. | 166/300 |
| 6,133,218 A | 10/2000 | Kerobo et al. | 510/365 |
| 6,135,987 A | 10/2000 | Tsai et al. | 604/365 |
| 6,143,698 A | 11/2000 | Murphey et al. | 507/145 |
| 6,162,766 A | 12/2000 | Muir et al. | 507/267 |
| 6,166,151 A | 12/2000 | Hariharan et al. | 525/463 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,279,656 B1 | 8/2001 | Sinclair et al. | |
| 6,291,077 B1 | 9/2001 | Hariharan et al. | 428/480 |
| 6,311,773 B1 | 11/2001 | Todd et al. | 166/280.2 |
| 6,322,722 B1 | 11/2001 | Bhattacharjee et al. | 252/182.24 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280.2 |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,414,170 B1 | 7/2002 | Kim et al. | 554/52 |
| 6,422,314 B1 | 7/2002 | Todd et al. | 166/312 |
| 6,440,919 B1 | 8/2002 | Kerobo et al. | 510/365 |
| 6,451,346 B1 | 9/2002 | Shah et al. | 424/486 |
| 6,454,003 B1 | 9/2002 | Chang et al. | 166/270 |
| 6,469,132 B1 | 10/2002 | Eisenberg et al. | 528/354 |
| 6,485,947 B1 | 11/2002 | Rajgarhia et al. | 435/139 |
| 6,488,091 B1 | 12/2002 | Weaver et al. | 166/300 |
| 6,488,763 B2 | 12/2002 | Brothers et al. | 106/692 |
| 6,494,263 B2 | 12/2002 | Todd | 166/312 |
| 6,508,305 B1 | 1/2003 | Brannon et al. | 166/293 |
| 6,509,301 B1 | 1/2003 | Vollmer | 507/236 |
| 6,527,051 B1 | 3/2003 | Reddy et al. | 166/300 |
| 6,541,033 B1 | 4/2003 | Shah | 424/486 |
| 6,554,071 B1 | 4/2003 | Reddy et al. | 166/293 |
| 6,562,897 B1 | 5/2003 | Thetford | 524/547 |
| 6,569,814 B1 | 5/2003 | Brady et al. | 507/201 |
| 6,599,863 B1 | 7/2003 | Palmer et al. | 507/219 |
| 6,632,457 B1 | 10/2003 | Sawhney | 424/501 |
| 6,653,395 B1 | 11/2003 | Bergstrom et al. | 524/599 |
| 6,667,279 B1 | 12/2003 | Hessert et al. | 507/225 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,702,023 B1 | 3/2004 | Harris et al. | 166/307 |
| 6,710,019 B1 | 3/2004 | Sawdon | 507/136 |
| 6,761,218 B2 | 7/2004 | Nguyen et al. | 166/278 |
| 6,763,888 B1 | 7/2004 | Harris et al. | 166/305.1 |
| 6,793,018 B2 | 9/2004 | Dawson et al. | 166/300 |
| 6,817,414 B2 | 11/2004 | Lee | 166/278 |
| 6,837,309 B2 | 1/2005 | Boney et al. | 166/208.2 |
| 6,896,058 B2 | 5/2005 | Munoz et al. | 166/279 |
| 6,949,491 B2 | 9/2005 | Cooke | 507/219 |
| 6,983,801 B2 | 1/2006 | Dawson et al. | 166/300 |
| 7,036,585 B2 * | 5/2006 | Zhou et al. | 166/268 |
| 7,080,688 B2 | 7/2006 | Todd et al. | 166/278 |
| 7,178,596 B2 | 2/2007 | Blauch et al. | 166/280.2 |
| 7,195,068 B2 | 3/2007 | Todd | |
| 7,219,731 B2 * | 5/2007 | Sullivan et al. | 166/278 |
| 7,299,876 B2 | 11/2007 | Lord et al. | |
| 7,353,876 B2 | 4/2008 | Savery et al. | |
| 7,353,879 B2 | 4/2008 | Todd et al. | |
| 7,413,017 B2 | 8/2008 | Nguyen, et al. | |
| 7,448,450 B2 | 11/2008 | Luke et al. | |
| 7,455,112 B2 | 11/2008 | Moorehead, et al. | |
| 7,461,697 B2 | 12/2008 | Todd et al. | |
| 7,475,728 B2 | 1/2009 | Pauls, et al. | |
| 7,484,564 B2 | 2/2009 | Welton et al. | |
| 7,497,258 B2 | 3/2009 | Savery et al. | |
| 7,497,278 B2 | 3/2009 | Schriener et al. | |
| 7,506,689 B2 | 3/2009 | Surjaatmadja et al. | |
| 7,595,280 B2 | 9/2009 | Welton et al. | |
| 7,598,208 B2 | 10/2009 | Todd | |
| 7,608,566 B2 | 10/2009 | Saini et al. | |
| 7,608,567 B2 | 10/2009 | Saini | |
| 2001/0016562 A1 | 8/2001 | Muir et al. | 507/201 |
| 2002/0036088 A1 | 3/2002 | Todd | 166/300 |
| 2002/0125012 A1 | 9/2002 | Dawson et al. | 166/300 |
| 2002/0161134 A1 | 10/2002 | Kim et al. | 525/408 |
| 2002/0169274 A1 | 11/2002 | Eisenberg et al. | 528/354 |
| 2003/0060374 A1 | 3/2003 | Cooke | 507/200 |

| Publication No. | Date | Inventor | Class |
|---|---|---|---|
| 2003/0099709 A1 | 5/2003 | Shah et al. | 424/469 |
| 2003/0114314 A1 | 6/2003 | Ballard et al. | 507/100 |
| 2003/0119678 A1 | 6/2003 | Crews | |
| 2003/0130133 A1 | 7/2003 | Vollmer | 507/100 |
| 2003/0188766 A1 | 10/2003 | Banerjee et al. | 134/7 |
| 2003/0204012 A1 | 10/2003 | Thetford | 524/547 |
| 2003/0234103 A1 | 12/2003 | Lee et al. | 166/293 |
| 2004/0014607 A1 | 1/2004 | Sinclair et al. | 507/200 |
| 2004/0040706 A1 | 3/2004 | Hossaini et al. | 166/278 |
| 2004/0055747 A1 | 3/2004 | Lee | 166/278 |
| 2004/0094300 A1 | 5/2004 | Sullivan et al. | 166/308.1 |
| 2004/0094301 A1 | 5/2004 | Hughes et al. | 166/308.2 |
| 2004/0106525 A1 | 6/2004 | Willberg et al. | 507/200 |
| 2004/0138068 A1 | 7/2004 | Rimmer et al. | 507/100 |
| 2004/0152601 A1 | 8/2004 | Still et al. | 507/100 |
| 2004/0152602 A1 | 8/2004 | Boles | 507/100 |
| 2004/0214724 A1 | 10/2004 | Todd et al. | 507/117 |
| 2004/0216876 A1 | 11/2004 | Lee | 166/280.1 |
| 2004/0231845 A1 | 11/2004 | Cooke | 166/279 |
| 2004/0261993 A1 | 12/2004 | Nguyen | 166/276 |
| 2004/0261995 A1 | 12/2004 | Nguyen et al. | 166/279 |
| 2004/0261996 A1 | 12/2004 | Munoz, Jr. et al. | 166/279 |
| 2004/0261999 A1 | 12/2004 | Nguyen | 166/292 |
| 2005/0006095 A1 | 1/2005 | Justus et al. | 166/295 |
| 2005/0028976 A1 | 2/2005 | Nguyen | 166/276 |
| 2005/0034861 A1 | 2/2005 | Saini et al. | 166/278 |
| 2005/0034865 A1 | 2/2005 | Todd et al. | 166/304 |
| 2005/0034868 A1 | 2/2005 | Frost et al. | 166/307 |
| 2005/0045328 A1 | 3/2005 | Frost et al. | 166/278 |
| 2005/0051330 A1 | 3/2005 | Nguyen | 166/276 |
| 2005/0056423 A1 | 3/2005 | Todd et al. | 166/278 |
| 2005/0059556 A1 | 3/2005 | Munoz et al. | 507/103 |
| 2005/0059557 A1 | 3/2005 | Todd et al. | 507/110 |
| 2005/0059558 A1 | 3/2005 | Blauch et al. | 507/203 |
| 2005/0103496 A1 | 5/2005 | Todd et al. | 166/278 |
| 2005/0126780 A1 | 6/2005 | Todd et al. | 166/279 |
| 2005/0126785 A1 | 6/2005 | Todd | 166/307 |
| 2005/0130848 A1 | 6/2005 | Todd et al. | 507/200 |
| 2005/0161220 A1 | 7/2005 | Todd et al. | 166/308.1 |
| 2005/0167104 A1 | 8/2005 | Roddy et al. | 166/279 |
| 2005/0167105 A1 | 8/2005 | Roddy et al. | 166/293 |
| 2005/0167107 A1 | 8/2005 | Roddy et al. | 166/295 |
| 2005/0183741 A1 | 8/2005 | Surjaatmadja et al. | 134/6 |
| 2005/0205258 A1 | 9/2005 | Reddy et al. | 166/292 |
| 2005/0205265 A1 | 9/2005 | Todd et al. | 166/376 |
| 2005/0205266 A1 | 9/2005 | Todd et al. | 166/376 |
| 2005/0252659 A1 | 11/2005 | Sullivan et al. | 166/280.1 |
| 2005/0272613 A1 | 12/2005 | Cooke | 507/219 |
| 2005/0274517 A1 | 12/2005 | Blauch et al. | 166/280.2 |
| 2005/0277554 A1 | 12/2005 | Blauch et al. | 507/224 |
| 2006/0016596 A1 | 1/2006 | Pauls et al. | 166/276 |
| 2006/0032633 A1 | 2/2006 | Nguyen | 166/280.2 |
| 2006/0046938 A1 | 3/2006 | Harris et al. | 507/219 |
| 2006/0048938 A1 | 3/2006 | Kalman | 166/278 |
| 2006/0065397 A1 | 3/2006 | Nguyen et al. | 166/280.1 |
| 2006/0105917 A1 | 5/2006 | Munoz | 507/103 |
| 2006/0105918 A1 | 5/2006 | Munoz | 507/203 |
| 2006/0169182 A1 | 8/2006 | Todd et al. | 106/802 |
| 2006/0169448 A1 | 8/2006 | Savery et al. | |
| 2006/0169449 A1 | 8/2006 | Mang et al. | 166/278 |
| 2006/0169450 A1 | 8/2006 | Mang et al. | 166/278 |
| 2006/0169452 A1 | 8/2006 | Savery et al. | |
| 2006/0169453 A1 | 8/2006 | Savery et al. | |
| 2006/0172893 A1 | 8/2006 | Todd et al. | 507/203 |
| 2006/0172894 A1 | 8/2006 | Mang et al. | 507/219 |
| 2006/0172895 A1 | 8/2006 | Mang et al. | 507/219 |
| 2006/0185847 A1 | 8/2006 | Saini et al. | 166/279 |
| 2006/0185848 A1 | 8/2006 | Surjaatmadja et al. | 166/280.2 |
| 2006/0205608 A1 | 9/2006 | Todd | |
| 2006/0243449 A1 | 11/2006 | Welton et al. | |
| 2006/0247135 A1 | 11/2006 | Welton et al. | |
| 2006/0254774 A1 | 11/2006 | Saini et al. | |
| 2006/0258543 A1 | 11/2006 | Saini | 507/219 |
| 2006/0258544 A1 | 11/2006 | Saini | 507/219 |
| 2006/0283597 A1 | 12/2006 | Schriener et al. | 166/300 |
| 2007/0042912 A1 | 2/2007 | Welton et al. | |
| 2007/0049501 A1 | 3/2007 | Saini et al. | |
| 2007/0066492 A1 | 3/2007 | Funkhouser et al. | |
| 2007/0078063 A1 | 4/2007 | Munoz, Jr. | |
| 2007/0078064 A1 | 4/2007 | Munoz et al. | |
| 2007/0238623 A1 | 10/2007 | Saini et al. | |
| 2007/0281868 A1 | 12/2007 | Pauls et al. | |
| 2007/0298977 A1 | 12/2007 | Mang et al. | |
| 2008/0009423 A1 | 1/2008 | Mang et al. | |
| 2008/0026955 A1 | 1/2008 | Munoz et al. | |
| 2008/0026959 A1 | 1/2008 | Munoz et al. | |
| 2008/0026960 A1 | 1/2008 | Munoz et al. | |
| 2008/0027157 A1 | 1/2008 | Munoz et al. | |
| 2008/0070810 A1 | 3/2008 | Mang | |
| 2008/0139415 A1 | 6/2008 | Todd et al. | |
| 2008/0169102 A1 | 7/2008 | Carbajal et al. | |
| 2009/0062157 A1 | 3/2009 | Munoz et al. | |
| 2009/0258798 A1 | 10/2009 | Munoz | |

FOREIGN PATENT DOCUMENTS

| | | |
|---|---|---|
| EP | 1413710 | 4/2004 |
| GB | 2412389 | 3/2004 |
| JP | 10292022 | 4/1997 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO95/08389 | 3/1995 |
| WO | WO 95/09879 | 4/1995 |
| WO | WO 97/11845 | 4/1997 |
| WO | WO98/27132 | 6/1998 |
| WO | WO 99/27229 | 6/1999 |
| WO | WO99/55762 | 11/1999 |
| WO | WO01/41735 | 7/2001 |
| WO | WO 01/87797 | 11/2001 |
| WO | WO 03/056130 | 12/2001 |
| WO | WO 02/055843 | 1/2002 |
| WO | WO 02/12674 | 2/2002 |
| WO | WO02/46268 | 6/2002 |
| WO | WO02/070861 | 9/2002 |
| WO | WO03/000766 | 1/2003 |
| WO | WO 03/027431 | 4/2003 |
| WO | WO03/033592 | 4/2003 |
| WO | WO03/033593 | 4/2003 |
| WO | WO03/054120 | 7/2003 |
| WO | WO03/087189 | 10/2003 |
| WO | WO03/095597 | 11/2003 |
| WO | WO 2004/037946 | 5/2004 |
| WO | WO 2004/038176 | 5/2004 |
| WO | WO 2004/038176 A1 | 5/2004 |
| WO | WO 2006/120422 A1 | 11/2006 |

OTHER PUBLICATIONS

Saul, Dorothy et al.; "Phase Structure and Rheological Properties of a Mixed Switterionic/Anionic Surfactant System"; J. Chem. Soc. Faraday Transactions 2,70; pp. 163-170 Jul. 1973.

R. Dimova et al.; "Hyperviscous diblock copolymer vesicles"; The European Physical Journal E; 241-250.

N. Kumar, et al.; "Biodegradable block copolymers"; Advanced Drug Delivery Reviews; 53; pp. 23-44.

W.E. Hennink et al.; "Novel crosslinking methods to design hydrogels"; Advanced Drug Delivery Reviews; 54; pp. 13-36.

Dennis Discher et al.; "Polymer Vesicles"; Science, vol. 297.

San Yeob Park; et al.; Micellization and Gelation of Aqueous Solutions of Star-Shaped PLLA-PEO Block Copolymers; Center for Advanced Functional Polymers; Korea Advanced Institute of Science and Technology; Macromolecules, 36, 4115-4124, 2003.

Fenghua Meng, et al.; "Biodegradable Polymersomes"; Macromolecules, 36, 3004-3006, 2003.

Hoffman, H. et al.; "Influence of Ionic Surfactants on the Viscoelastic Properties of Zwitterionic Surfactant Solutions", Langmuir, vol. 8, pp. 2140-2146, 1992.

Black, Fiona E. et al.; "Surface engineering and surface analysis of a biodegradable polymer with biotinylated end groups"; Langmuir; vol. 15, No. 9; pp. 3157-3161, 1999.

Ma, J. et al.; Improved interfacial Coacervation Technique to Fabricate Biodegradable Nanocapsules of an Aqueous Peptide Solution from Polylactide and its Block Copolymers with Poly(Ethylene Glycol); Colloid & Polymer Science, 279, No. 4, p. 387-392, Apr. 2001.

Marchessault, R.H. et al.; "Preparation and Characterisation of Low Molecular Weight Poly(3-Hydroxybutyrate)s and their Block Copolymers with Polyoxyethylene"; Polymer Preprints; vol. 40, No. 1, p. 527-528, 1999.

Gallardo, A. et al.; "Contribution of Polymers to the Design and Development of Microencapsulated Systems of Biomedical Interest"; Rev. Plast. Mod.; No. 504, p. 577-586.

Anderson, B.C. et al.; "Understanding drug release from poly(ethylene oxide)-b-poly(propylene oxide)-b-poly(ethylene oxide) gels"; J Control Release; vol. 70, No. 1-2; pp. 157-167, Jan. 29, 2001.

Amiji, M., et al.; "Prevention of Protein Adsorption and Platelet Adhesion on Surfaces by PEO/PPO/PEO Triblock Copolymers"; Biomaterials; No. 10., p. 682-692, 1992.

Liu, Y., et al.; "Small-Angle Neutron Scattering Analysis of the Structure and Interaction of triblock Copolymer Micelles in Aqueous Solution"; Macromolecultes; No. 7, p. 2236-2244, Apr. 7, 1998.

Foreign communication related to a counterpart application, Jul. 25, 2006.

Cordes, et al., Mechanism and Catalysis of Acetals, Ketals, and Other Esters, Department of Chemistry, Indiana University, Bloomington, Indiana, Chemical Reviews, 1974, vol. 74, No. 5 pp. 581-603, 1974.

Todd, et al., A Chemical "Trigger" Useful for Oilfield Applications, Society of Petroleum Engineers, Inc., SPE 92709, Feb. 4, 2005.

Simmons, et al., Poly(phenyllactide): Synthesis, Characterization, and Hydrolytic Degradation, Biomacromolecules, vol. 2, No. 2, 2001 (pp. 658-663), 2001.

Yin, et al., Preparation and Characterization of Substituted Polylactides, American Chemical Society, vol. 32, No. 23, 2000 (pp. 7711-7778), 2000.

Yin, et al., Synthesis and Properties of Polymers Derived from Substituted Lactic Acids, American Chemical Society, Ch. 12, 2001 (pp. 147-159), 2001.

Cantu, et al, Laboratory and Field Evaluation of a Combined Fluid-Loss-Control Additive and Gel Breaker for Fracturing Fluids, SPE 18211, Society of Petroleum Engineers, 1990.

Love, et al, Selectivity Placing Many Fractures in Openhole Horizontal Wells Improves Production, SPE 50422, Society of Petroleum Engineers, 1998.

McDaniel, et al, Evolving New Stimulation Process Proves Highly Effective in Level 1 Dual-Lateral completion, SPE 78697, Society of Petroleum Engineers, 1998.

Albertson, et al, Aliphatic Polyesters: Synthesis, Properties and Applications, Advances in Polymer Science, vol. 157, Degradable Aliphatic Polyesters, 2002.

Dechy-Cabaret, et al, Controlled Ring-Opening Polymerization of Lactide and Glycolide, American Chemical Society, Chemical Reviews, A-Z, AA-AD, received 2004.

Funkhouser, et al, Synthetic Polymer Fracturing Fluid for High-Temperature Applications, SPE 80236, Society of Petroleum Engineers, 2003.

Chelating Agents, Encyclopedia of Chemical Technology, vol. 5 (764-795).

Vichaibun, et al. A new Assay for the Enzymatic Degradation of Polylactic Acid, Short Report, Science Asia, vol. 29, 2003 (pp. 297-300), 2003.

Halliburton, SurgiFrac Service, A Quick and Cost-Effective Method to Help Boost Production From Openhole Horizontal Completions, Halliburton Communications, H03297, 2002.

Halliburton, CobraFrac Service, Coiled Tubing Fracturing-Cost-Effective Method for Stimulating untapped Reserves, H02319R, Halliburton Energy Services, 2000.

Halliburton, CobraJet Frac Service, Cost-Effective Technology That Can Help Reduce Cost Per BOE Produced, Shorten Cycle Time and Reduce Capex, Halliburton Communications.

Y. Chiang et al.: "Hydrolysis of Ortho Esters: Further Investigation of the Factors Which Control the Rate-Determining Step," Engineering Information Inc., NY, NY, vol. 105, No. 23 (XP-002322842), Nov. 16, 1983.

M. Ahmad, et al.: "Ortho Ester Hydrolysis: Direct Evidence for a Three-Stage Reaction Mechanism, "Engineering Information Inc., NY, NY, vol. 101, No. 10 (XP-002322843), May 9, 1979.

Office Action from U.S. Appl. No. 11/127,583, Mar. 25, 2008.

Office Action from U.S. Appl. No. 11/128,060, Mar. 25, 2008.

Office Action for U.S. Appl. No. 11/127,583 mailed Nov. 25, 2008.

Office Action for U.S. Appl. No. 11/128,060 mailed Nov. 26, 2008.

NatureWorks Product Bulletin entitled NatureWorks PLA Polymer 3001D, Injection Molding Process Guide, 2005.

NatureWorks Product Bulletin entitled NatureWorks PLA Polymer 4060D, For Heat Seal Layer in Coextruded Oriented Films, 2005.

NatureWorks article entitled NatureWorks, Crystallizing and Drying of PLA, 2005.

Office Action for U.S. Appl. No. 11/128,060 dated May 14, 2009.

Notice of Allowance and Notice of Allowability for U.S. Appl. No. 11/127,583, dated May 28, 2009.

* cited by examiner

DEGRADABLE SURFACTANTS AND METHODS FOR USE

CROSS-REFERENCE TO RELATED APPLICATIONS

This application is a continuation-in-part of U.S. application Ser. No. 11/128,060 filed on May 12, 2005, the entire disclosure of which is incorporated herein by reference.

BACKGROUND

The present invention relates to methods and compositions for use in subterranean operations. More particularly, the present invention relates to methods that use degradable surfactants for generating acids in a subterranean formation.

Surfactants may be used in a variety of subterranean operations. Such operations include, but are not limited to, drilling operations, stimulation treatments (e.g., fracturing treatments, acidizing treatments), and completion operations (e.g., sand control treatments). In these subterranean operations, surfactants may be used for a number of purposes, such as emulsifying agents, non-emulsifying agents, foaming agents, defoaming agents, viscosifying (e.g., gelling) agents, dispersants, wetting agents, and the like.

While a variety of surfactants have been used in subterranean operations, various problems have been associated with their use. For instance, certain surfactants used heretofore may have undesirable environmental characteristics and/or may be limited by strict environmental regulations in certain areas of the world. As a result, use of these surfactants in subterranean operations may result in the potential for the bioaccumulation and/or persistence of such surfactants in the environment, which may create potential dangers for their use, such as adverse effects on shrimp and other aqueous aquatic species. Additionally, certain surfactants may tend to oil wet a surface which may be undesirable in certain instances.

Degradable materials also are commonly employed in subterranean operations. In some instances, the degradable materials may be capable of releasing a desirable degradation product, e.g., an acid, during its hydrolysis. The acid released by certain degradable materials may be used to facilitate a reduction in viscosity of a fluid or to degrade a filter cake, as well as for numerous other functions in subterranean operations. However, degradable materials used heretofore, such as particulate poly(lactic) acid may not be water-soluble.

A variety of viscosified treatment fluids may be used in subterranean operations, such as drilling fluids, fracturing fluids, and gravel-pack fluids. Oftentimes, after the viscosified fluid has performed its desired task, it may be desirable to reduce its viscosity so that the treatment fluid may be recovered from the formation and/or particulate matter may be deposited within the formation at a desired location. Reducing the viscosity of a viscosified treatment fluid is often referred to as "breaking" the fluid.

For some viscosified treatment fluids, viscosity may be related to pH. Thus, viscosity-reducing agents that reduce the pH of the treatment fluid may be added to reduce the viscosity of the fluid. Internal breakers, such as enzymes, oxidizers, acids, or temperature-activated viscosity reducers, also may be used to reduce the viscosity of viscosified treatment fluids. Unfortunately, these traditional breakers may result in an incomplete or premature viscosity reduction. Premature viscosity reduction is undesirable as it may lead, inter alia, to particulates settling out of a fracturing or gravel-packing fluid in an undesirable location and/or at an undesirable time. Moreover, conventional non-delayed breakers begin to reduce the viscosity of the viscosified fluid upon addition and continue to reduce the fluid's viscosity with time until the fluid is completely broken or until the breaker is expended. Since the breaking activity begins immediately, it is common practice to start with excess gelling agent to offset the point at which the viscosity falls below an acceptable level. Using excess gelling agent is not only an added expense; it also may lead to excessive friction pressure during treatment placement and/or in additional formation damage.

As an alternative to using traditional breakers, breaking a viscosified treatment fluid also may be accomplished using just time and/or temperature. For example, the viscosity of most treatment fluids will reduce naturally if given enough time at a sufficient temperature. However, such methods generally are not practical as it is generally desirable to return the well back to production as quickly as possible as opposed to waiting for the viscosity of a treatment fluid to naturally decrease over time.

Inclusion of an acid-releasing degradable material in a viscosified treatment fluid, such as a gelled (and optionally crosslinked) treatment fluid, may be used to facilitate a reduction in viscosity of such fluid. Generally, these degradable materials likely will hydrolyze over time due to contact with water present in the fluid, thereby releasing an acid. Upon its release, the acid may function, inter alia, to reduce the viscosity of the viscosified treatment fluid, for example, by breaking the crosslinks in the treatment fluid, reducing the pH of the treatment fluid sufficiently to reverse the crosslinks therein, and/or breaking down the backbone of the gelling agent present in the treatment fluid. In some instances, the acid released by the degradable materials may breakdown gelling agents at temperatures above about 150° F.

Degradable materials capable of releasing an acid also may be used in the degradation of acid-soluble materials present in a subterranean formation, such as the formation itself (e.g., in matrix acidizing, fracture acidizing, etc.), calcium carbonate, and acid-soluble components of completion equipment (such as plugs, sleeves, etc.). In some instances, the acid released by the degradable material may be used to facilitate the setting of an acid-settable resin. In some instances, the acid may activate an oxidizer (e.g., sodium chlorite) that is a stronger oxidizer at a lower pH. In other instances, filter cakes commonly may be formed by a fluid (e.g., a drill-in and servicing fluid) on the face of a portion of a subterranean formation, inter alia, to minimize damage to the permeability thereof. The filter cake often comprises an acid-soluble component (e.g., a calcium carbonate bridging agent) and a polymeric component (e.g., starch and xanthan). Before desirable fluids, such as hydrocarbons, may be produced, the filter cake generally is removed. To facilitate the degradation of the acid-soluble component, a degradable material capable of releasing an acid may be utilized. Filter cakes also may be removed using an acid where the filter cake does not contain an acid-soluble component, for example, by degrading the underlying carbonate adjacent, if the filter cake is present in a carbonate formation. In some instance, to facilitate the degradation thereof, the filter cake may be contacted by a treatment fluid that comprises water and the degradable material. The acid produced by the resultant hydrolysis of the degradable material may interact with the acid-soluble component of the filter cake and/or the underlying carbonate adjacent to the filter cake in such a way as to facilitate their degradation. Among other components, the treatment fluid may contain oxidizing agents or enzymes suitable to facilitate the degradation of the polymeric component of the filter cake.

SUMMARY

The present invention relates to methods and compositions for use in subterranean operations. More particularly, the present invention relates to methods that use degradable surfactants for generating acids in a subterranean formation.

In one embodiment, the present invention provides a method of generating an acid downhole. An example of such a method comprises providing a degradable surfactant; introducing the degradable surfactant into a well bore that penetrates a subterranean formation; and allowing at least a portion of the degradable surfactant to degrade, thereby releasing an acid.

In another embodiment, the present invention provides a method of reducing the viscosity of a viscosified treatment fluid. An example of such a method comprises providing a degradable surfactant; allowing at least a portion of the degradable surfactant to degrade, thereby releasing an acid; and contacting the viscosified treatment fluid with the acid, wherein the acid reduces the viscosity of the viscosified treatment fluid.

In yet another embodiment, the present invention provides a method of degrading an acid-soluble component present within a subterranean formation. An example of such a method comprises providing a degradable surfactant; introducing the degradable surfactant into the subterranean formation; allowing at least a portion of the degradable surfactant to degrade, thereby releasing an acid; and contacting the acid-soluble component with the acid so that the acid facilitates the degradation of the acid-soluble component.

The features and advantages of the present invention will be readily apparent to those skilled in the art upon a reading of the description of the preferred embodiments that follows.

DESCRIPTION OF PREFERRED EMBODIMENTS

The present invention relates to methods and compositions for use in subterranean operations. More particularly, the present invention relates to methods that use degradable surfactants for generating acids in a subterranean formation. As used herein, the phrase "degradable surfactant" refers to surfactant molecules, wherein the surfactant molecules contain a backbone of repeating units of degradable groups, such as esters or other derivatives, for example, anhydrides, acetals, orthoesters, esteramides, ester ethers, ester carbonates, or ester urethanes as the degradable hydrophobic portion in the surfactant molecule attached to the hydrophilic portion, or as the degradable hydrophilic portion in the surfactant molecule attached to the hydrophobic portion. Upon degradation, the degradable surfactants should release a degradation product, such as an acid, that may be used to break a viscosified treatment fluid, degrade an acid-soluble component present in the subterranean formation, and/or to facilitate the setting of an acid-settable resin. In certain embodiments, the degradable surfactants may also be used for any of a number of other functions, such as emulsifying agents, non-emulsifying agents, foaming agents, defoaming agents, viscosifying (or gelling) agents, dispersants, wetting agents, and the like.

I. Degradable Surfactants

The degradable surfactants useful in the present invention may be any suitable degradable surfactant. Suitable degradable surfactants should release an acid upon degradation. As previously mentioned suitable degradable surfactants comprise a backbone that comprises degradable groups that may be a hydrophilic portion or a hydrophobic portion. Suitable degradable groups include, but are not limited to, esters, anhydrides, acetals, orthoesters, esteramides, ester ethers, ester carbonates, ester urethanes, and combinations thereof. One example of a suitable degradable surfactant includes degradable block copolymer surfactants that comprise a hydrophilic polymeric block and a hydrophobic degradable polymeric block. As used herein, the phrase "degradable block copolymer surfactant" is intended to be broad enough to include graft copolymers, as well as block copolymers.

Because the degradable surfactants have built into their structure a bond with limited stability, degradation of this bond should at least partially decrease the surface activity of the surfactants. In some embodiments, the degradable surfactants may cleave at the juncture of the hydrophobic and hydrophilic polymeric block for a particular surfactant molecule, which may result in the instantaneous disappearance of the surface activity for that surfactant molecule. As a result, the degradable surfactants are capable of undergoing an irreversible degradation. The term "irreversible," as used herein, means that the degradable surfactant should degrade in situ (e.g., within a well bore) but should not reconstitute or reform in situ after degradation. The terms "degradation" and/or "degradable" refer to the conversion of materials into smaller components, intermediates, or end products by the result of hydrolytic degradation, biologically formed entities (e.g., bacteria or enzymes), chemical reactions, thermal reactions, or reactions induced by radiation. The degradability of the degradable surfactants used in the present invention depends, in part, on the backbone structure of the hydrophobic portion or the hydrophilic portion. For instance, the presence of hydrolyzable and/or oxidizable linkages in the backbone often yields a degradable surfactant that will degrade as described herein. The rates at which such surfactants degrade are dependent on the type of repetitive unit, composition, sequence, length, molecular geometry, molecular weight, stereochemistry, morphology (e.g., crystallinity, size of spherulites, and orientation), hydrophilicity, hydrophobicity, surface area, and additives. Also, the environment to which the degradable surfactant is subjected may affect how it degrades, e.g., temperature, presence of moisture, oxygen, microorganisms, enzymes, pH, and the like. Upon degradation, the degradable surfactants may release a desirable degradation product, such as an acid that may be used to break a viscosified treatment fluid, degrade an acid-soluble component present in the subterranean formation, and/or to facilitate the setting of an acid-settable resin.

Among other things, degradation of the degradable surfactants may be sensitive to pH. For example, degradable surfactants comprising an aliphatic polyester hydrophobic portion degrade rapidly at a higher pH (e.g., about 9 to about 14) and may be most stable at a pH of about 6. On the other hand, degradable surfactants comprising a poly(orthoester) hydrophobic portion are stable at the higher pHs, but poly(orthoesters) may degrade at pHs of about 8 or less. With an increase in temperature, the hydrolysis of the surfactant should become faster.

The degradable surfactants should be suitable for use at temperatures that they will encounter during subterranean operations, for as long a time period as maintenance of their surface activity is desired for the particular end use. Generally, the rates of degradation should increase with increasing temperature. At higher bottomhole temperatures (e.g., greater than about 150° C., certain degradable surfactants, such as those having ester carbonates in the backbone, may be suitable for use. One of ordinary skill in the art, with the benefit of this disclosure, should be able to determine the appropriate degradable surfactant to use based on, among other things, the particular bottomhole temperatures that may be encountered.

The function that a particular degradable surfactant useful in the present invention may perform depends on a variety of factors. These factors may include, but are not limited to, the choice of the hydrophobic and hydrophilic portions and the relative amounts thereof, and the presence of any cationic, ionic, non-ionic, amphoteric, or Zwitterionic groups. For example, whether an oil-in-water ("O/W") or water-in-oil ("W/O") emulsion is formed may be determined by the relative hydrophobicity of the degradable polymeric block or tail and the hydrophilicity of the hydrophilic polymeric block or head group. The hydrophilic/lipophilic balance ("HLB") of the surfactant may provide a quantitative prediction of whether the surfactant will facilitate the formation of an O/W or a W/O emulsion. HLB is a well known system that can be determined from the chemical formula of the surfactant using empirically determined group numbers. For the degradable surfactants utilized in the present invention, the HLB may be controlled by controlling the length of the polymeric chain during the polymerization reaction. For example, where the degradable surfactant is prepared from a glycolide or a lactide, the HLB of the degradable surfactant may be controlled during the ring-opening by controlling the length of the lactide or glycolide chains. Even the HLB system is only semi-empirical, and other factors (such as the relative phase volume of oil and water) may have a considerable influence on the type of emulsion formed.

By varying the above-listed factors, the specific properties of the degradable surfactants such as solubility, wettability, emulsifying, foaming, antifoaming, cloud point, gelling, solubilizing agent, and the like may be varied. For example, where used as an emulsifying agent, a degradable surfactant having an HLB of from about 3 to about 6 may be suitable to stabilize a W/O emulsion. In other embodiments, where used as an emulsifying agent, a degradable surfactant having an HLB of from about 8 to about 18 may be suitable to stabilize an O/W. Those of ordinary skill in the art, with the benefit of this disclosure, will be able to determine the appropriate degradable surfactants to use for a particular application.

An example of a suitable degradable surfactant is described by Formula No. 1 below:

Formula No. 1

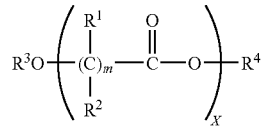

wherein $R^1$ is a hydrogen, alkyl, aryl, alkylaryl, acetyl, or heteroatoms; $R^2$ is a hydrogen, alkyl, aryl, alkylaryl, acetyl, or heteroatoms; $R^3$ is hydrogen, alkyl, aryl, alkylaryl, acetyl, alkoxyl, benzoyl, or heteroatoms; or a group comprising an anionic group, a cationic group, or a non-ionic group; $R^4$ is a group such as H, Na, K, or Li, or a group comprising an anionic group, a cationic group, or a non-ionic group; m can be an integer between 1 and 20; and X can be an integer between 2 and 100. The above formula represents a non-limiting example of a suitable degradable surfactant and numerous other embodiments of degradable surfactants are suitable for use in the present invention.

The degradable surfactants of the present invention may be formed by any suitable process, including, but not limited to, polycondensation reactions, ring-opening polymerizations, free radical polymerizations, anionic polymerizations, cationic polymerizations, coordinative ring-opening polymerizations, hydrogen-transfer polymerization, and any other suitable process. Ionic (e.g., cationic or anionic), non-ionic, amphoteric, or Zwitterionic head groups may be added prior to or after the process to form the degradable surfactant. The following exemplary reaction illustrates the preparation of a suitable degradable polymer with a hydrophobic end tail from a lactide or a poly(lactic acid) suitable for conversion to a degradable surfactant.

Exemplary Reaction No. 1

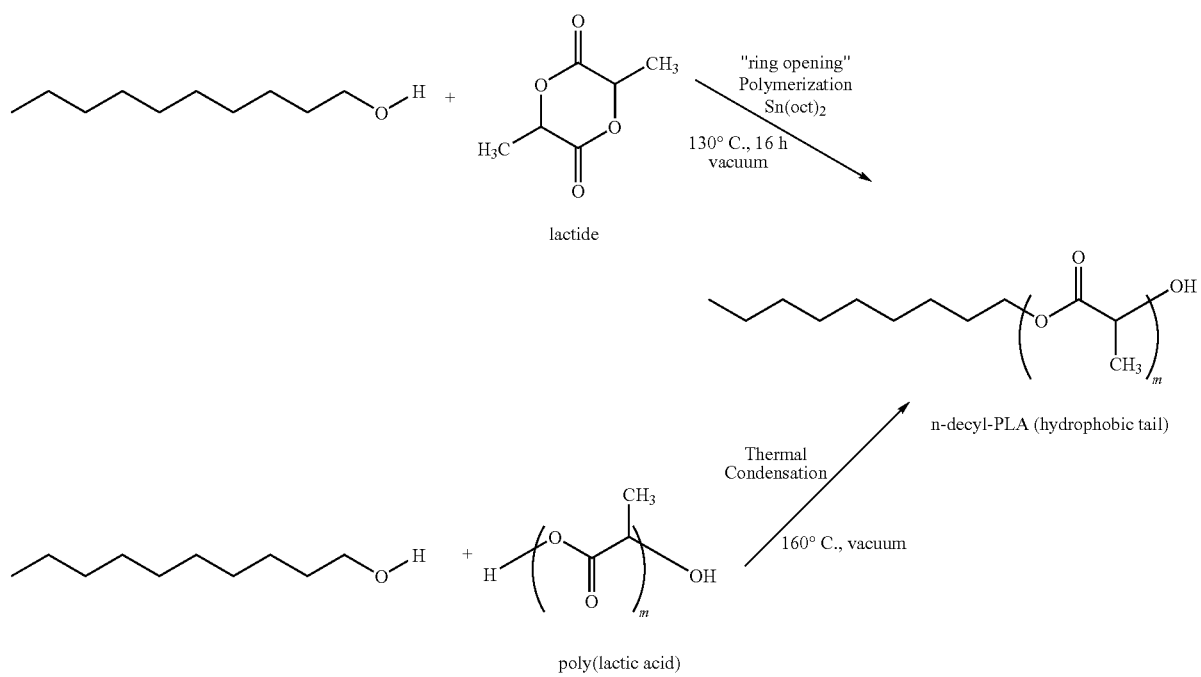

In some embodiments, the degradable surfactant may be a reaction product of a ring-opening polymerization reaction of a nucleophile with a cyclic lactone (e.g., a lactide, a glycolide, or a caprolactone). The nature of the nucleophile, e.g., whether it contains anionic, cationic, or non-ionic groups, may further help to control the functionality of the degradable surfactant. Examples of suitable cationic groups that may be added to the degradable surfactants include, but are not limited to, pyridinium group, primary secondary or tertiary amines that are protonated at low or middle pH ranges, and quaternary ammonium compounds and salts thereof. The following example illustrates the ring-opening reaction of ε-caprolactone by N,N-dimethylethanolamine in the presence of a catalytic amount of tin octanoate and the subsequent quaternization of the reaction product to yield a quaternary amine cationic surfactant.

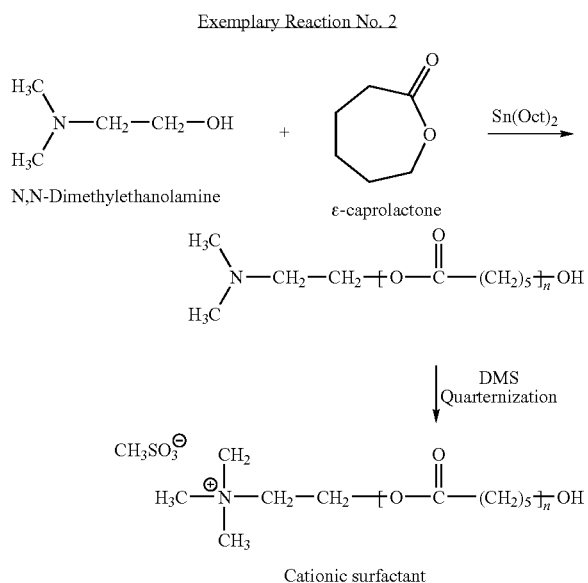

Examples of suitable anionic groups that may be added to the degradable surfactants include, but are not limited to, carboxylate groups, phosphate groups, phosphonate groups, sulfate groups, sulfonate groups, and their salts. For example, the head group may comprise a salt of a carboxylic acid. A sulfate group may be incorporated into the degradable surfactant as depicted in the example reaction below.

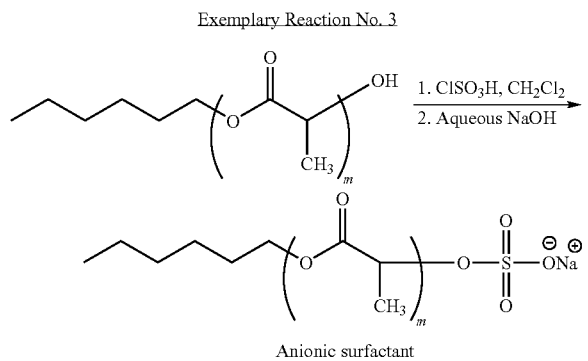

Examples of suitable non-ionic groups that may be added to the degradable surfactants include, but are not limited to, carboxylic acid (low pH), alcohol, polyols, sugars (e.g., sorbitan, sorbitol), and amines (neutral and high pH). In yet another embodiment, the degradable surfactants may be made amphoteric by the incorporation of groups such as amine alkanoates (e.g., betaines) or alkyl amine oxides. In some embodiments, amphoteric surfactants may be desirable, among other things, due to their compatibility with other surfactants, low skin and eye irritation, absorbability onto both positively and negatively charged surfaces, and low solubility in organic solvents II. Degradable Block Copolymer Surfactants In some embodiments of the present invention, suitable degradable surfactants may be a degradable block copolymer surfactant that comprises a hydrophilic polymeric block and a hydrophobic degradable polymeric block. Suitable degradable block copolymer surfactants should release an acid upon degradation. These degradable block copolymer surfactants may be prepared by any suitable process, including, but not limited to, polycondensation reactions, ring-opening polymerizations, free radical polymerizations, anionic polymerizations, cationic polymerizations, coordinative ring-opening polymerizations, hydrogen-transfer polymerization, and any other suitable process. Suitable degradable block copolymer surfactants include block copolymer surfactants, graft copolymer surfactants, and block-graft copolymer surfactants. Examples of suitable degradable block copolymer surfactants include linear diblock, triblock, or multiblock arrays, e.g., of the type A-B, A-B-A, B-A-B, A-B-A-B-A-B, (A-B)$_n$, where A and B are hydrophilic and hydrophobic degradable polymeric blocks, respectively, and n is any integer greater than or equal to 1. Degradable block copolymer surfactants of branched structure and macrocyclic structures, such as those depicted below, may also be suitable for use in the present invention.

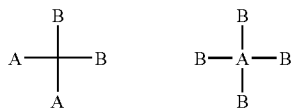

Example of Branched Block Copolymer

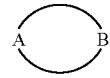

Example of Macrocyclic Structure

Suitable degradable block copolymer surfactants also may include graft copolymers and block-graft copolymers. An example structure for a block-graft copolymer is listed below.

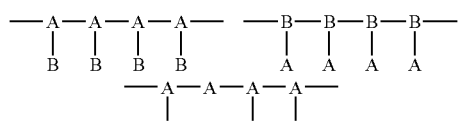

Example of Graft Block Copolymer

In one embodiment, a suitable graft copolymer surfactant may comprise a hydrophilic polymeric backbone having branches of a hydrophobic degradable polymeric block along its length, for example, guar grafted with polylactic acid or poly(caprolactone). In another embodiment, a suitable graft copolymer surfactant may comprise a hydrophobic degradable polymeric backbone having branches of a hydrophilic polymer along its length.

The hydrophilic polymeric block of the degradable block copolymer surfactants may comprise any suitable degradable or non-degradable hydrophilic polymer, including, but not limited to, poly(alkylene glycols) (e.g., poly(ethylene glycol)), poly(alcohols) (e.g., poly(vinyl alcohols)), poly(vinyl pyrrolidone), polysaccharides (e.g., dextran, cellulose, guar, starch, xanthan, etc.), chitins, chitosans, proteins, poly(amino acids) (e.g., poly(aspartic acid), poly(alkylene oxides) (e.g., poly(ethylene oxides)), poly(amides) (e.g., poly(acrylamide)), poly(acids) (e.g., poly(acrylic acid)), polyols (e.g., sorbitol, glucose, fructose, mannose, etc.), and combinations and copolymers thereof. The term "copolymer" as used herein is not limited to combinations of two polymers, but includes any combination of polymers, e.g., terpolymers and the like. In certain embodiments, the hydrophilic polymer block comprises a poly(alkylene glycol), such as poly(ethylene glycol). Suitable poly(ethylene glycols) include, but are not limited to, poly(ethylene glycol) methyl ether. In certain embodiments, the hydrophilic block comprises a poly(alkylene oxide), such as poly(ethylene oxide). Generally, the hydrophilic polymeric block of the degradable block copolymer surfactant may have a number average molecular weight in the range of from about 50 Daltons to about 6,000,000 Daltons. One of ordinary skill in the art, with the benefit of this disclosure, will be able to determine the appropriate number average molecular weight for the hydrophilic polymeric block based on a variety of factors, including the desired HLB and the particular function the degradable surfactant will perform.

The hydrophobic degradable polymeric block of the degradable block copolymer surfactants may include any suitable polyester, or other derivative, including, but not limited to, poly(anhydrides), poly(orthoesters), poly(lactic acids), poly(glycolic acids), poly(caprolactones), poly(hydroxybutyrates), polyether esters, polyester amides, polyester carbonates, polyester urethanes, polydioxanones, and combinations and copolymers thereof. In certain embodiments, the hydrophobic degradable polymeric block comprises a poly(lactic acid). As used herein, "poly(lactic acid)" refers to a polymer that may be synthesized from lactic acid by a condensation reaction, or more commonly by ring-opening polymerization of a cyclic lactide monomer, and is sometimes referred to as "PLA," "polylactate," or "polylactide." In certain embodiments, the hydrophobic degradable polymeric block comprises a poly(caprolactone). Suitable poly(caprolactones) include, but are not limited to, poly($\epsilon$-caprolactone). Because poly(caprolactone) has five methylene groups in its repeating unit segment, it is generally more hydrophobic than poly(lactic acid) and thus may be more suitable for forming an oil-soluble block where desired. Suitable aliphatic polyesters may, for example, comprise or be substituted with hydrophobic groups, such as alkyl, aralkyl, or aryl groups, to increase their hydrophobicity if desired. In some embodiments, a suitable hydrophobic degradable polymeric block of the degradable block copolymer surfactant may have a number average molecular weight in the range of from about 500 Daltons to about 20,000 Daltons. In other embodiments, a suitable hydrophobic degradable polymeric block of the degradable block copolymer surfactant may have a number average molecular weight in the range of from about 1,000 Daltons to about 5,000 Daltons. One of ordinary skill in the art, with the benefit of this disclosure, will be able to determine the appropriate number average molecular weight for the hydrophobic degradable polymeric block based on a variety of factors, including the desired hydrophilic/lipophilic balance and the particular function for the surfactant to perform.

To obtain a surfactant suitable for a particular application, the proportion of the hydrophilic polymeric block to the hydrophobic degradable polymeric block in a degradable block copolymer surfactant of the present invention may be modified, inter alia, based on the desired functionality of the degradable block copolymer surfactant. In some embodiments of the present invention, the hydrophilic polymeric block is present in a degradable block copolymer surfactant in an amount in the range of from about 5% to about 95% by weight of the surfactant, and the hydrophobic degradable polymeric block is present in the degradable block copolymer surfactant in an amount in the range of from about 5% to about 95% by weight of the surfactant.

One example of a suitable degradable block copolymer surfactant is an A-B diblock copolymer of poly(ethylene glycol) methyl ether and poly(lactic acid). Another example of a suitable degradable block copolymer surfactant is an A-B-A triblock copolymer of poly(ethylene glycol) and poly(lactic acid). Another example of a suitable degradable block copolymer surfactant is an A-B diblock or an A-B-A triblock copolymer of poly(lactide-co-glycolide) and poly(ethylene glycol) with an ionizable group on each end of the polymer chain. Another example of a suitable degradable block copolymer surfactant is a block copolymer of poly(ethylene glycol) methyl ether and poly($\epsilon$-caprolactone). Another example of a suitable degradable block copolymer surfactant is a triblock copolymer of poly(ethylene glycol) and poly($\epsilon$-caprolactone).

The degradable block copolymer surfactants useful in the present invention further may be modified to be ionic, cationic, anionic, amphoteric, or Zwitterionic, if desired. In some embodiments, at least a portion of a degradable block copolymer surfactant may be modified. These ionic, cationic, anionic, amphoteric, or Zwitterionic groups may be added to the ends or sides of the hydrophilic polymeric block or the hydrophobic degradable polymeric block. Non-ionic groups also may be added to the ends or sides of the hydrophilic polymeric block or the hydrophobic degradable polymeric block. In certain embodiments, suitable degradable block copolymer surfactants further may comprise a terminal acid group, an alcohol group, an amine group, or a tertiary amine group attached to the hydrophilic or hydrophobic degradable polymeric block.

While optional, the presence of ionic groups within the hydrophilic polymeric block of a degradable block copolymer surfactant or as a head group on the hydrophobic degradable polymeric block may be desired because the high water solubility of such charged groups may permit the use of a relatively small hydrophilic polymeric block and the interaction of the charged groups may enhance the stability of the degradable block copolymer surfactants by inhibiting aggregation. Examples of suitable cationic groups that may be added to the hydrophilic polymeric block or as a head group to the hydrophobic degradable polymeric block include, but are not limited to, a pyridinium group; a primary, secondary, or tertiary amine that are protonated at low or middle pH ranges; and quaternary ammonium compounds; and salts thereof. For example, a suitable quaternary ammonium degradable block copolymer surfactant salt is described by Formula No. 1 below:

Formula No. 2

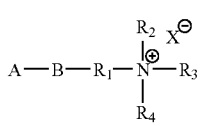

wherein $R_1$ is a methylene chain of from 1 to 4 carbons, alkyl, hydroxyl alkyl, ethoxylated alkyl, or arylalkyl group; $R_2$ is an alkyl, hydroxyl alkyl, ethoxylated alkyl, or arylalkyl group; $R_3$ is an alkyl, hydroxyl alkyl, ethoxylated alkyl, or an arylalkyl group; $R_4$ is an alkyl, hydroxyl alkyl, ethoxylated alkyl, or an arylalkyl group; and X is a chlorine, bromine, iodine, $\frac{1}{2}SO_4$, $HSO_4$, $CH_3SO_3$, or the like. A and B may be hydrophilic and hydrophobic degradable polymeric blocks, respectively, as described previously.

Another example of a suitable quaternary ammonium degradable block copolymer surfactant salt is described by Formula No. 2 below:

Formula No. 3

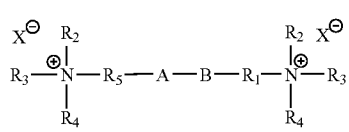

wherein $R_1$ is a methylene chain of from 1 to 4 carbons, alkyl, hydroxyl alkyl, ethoxylated alkyl, or arylalkyl group; $R_2$ is an alkyl, hydroxyl alkyl, ethoxylated alkyl, or arylalkyl group; $R_3$ is an alkyl, hydroxyl alkyl, ethoxylated alkyl, or an arylalkyl group; $R_4$ is an alkyl, hydroxyl alkyl, ethoxylated alkyl, or an arylalkyl group; $R_5$ is a methylene chain of from 1 to 4 carbons, alkyl, hydroxyl alkyl, ethoxylated alkyl, or arylalkyl group; X is a chlorine, bromine, iodine, $\frac{1}{2}SO_4$, $HSO_4$, $CH_3SO_3$, or the like. A and B may be hydrophilic and hydrophobic degradable polymeric blocks, respectively, as described previously.

Examples of suitable anionic groups that may be added to the hydrophilic polymeric block or as a head group to the hydrophobic degradable polymeric block include, but are not limited to, carboxylate groups, phosphate groups, phosphonate groups, sulfate groups, sulfonate groups, and their salts. Examples of suitable non-ionic groups that may be added to the hydrophilic polymeric block or as a head group to the hydrophobic degradable polymeric block include, but are not limited to, carboxylic acid (low pH), alcohol, polyols, sugars (e.g., sorbitan, sorbitol), and amines (neutral and high pH). In yet other embodiments, charged groups may be added to both the hydrophilic block and the hydrophobic degradable polymeric block of the degradable block copolymer surfactants. In yet another embodiment, the degradable block copolymer surfactants may be made amphoteric by the incorporation of groups such as amine alkanoates (e.g., betaines) or alkyl amine oxides into the degradable block copolymer surfactant. In some embodiments, amphoteric surfactants may be desirable, among other things, due to their compatibility with other surfactants, low skin and eye irritation, absorbability onto both positively and negatively charged surfaces, and low solubility in organic solvents.

Techniques that can be used for the preparation of suitable degradable block copolymer surfactants of the present invention are well known. For example, degradable block copolymer surfactants useful in the present invention may be formed by any suitable process, including, but not limited to, polycondensation reactions, ring-opening polymerizations, free radical polymerizations, anionic polymerizations, cationic polymerizations, coordinative ring-opening polymerizations, hydrogen-transfer polymerization, and any other suitable process. Once prepared, the degradable block copolymer surfactant, in certain embodiments, may be reacted with certain compounds to add a terminal acid group thereto, for example, succinic anhydride may be reacted with the terminal alcohol group of the degradable block copolymer surfactant to get a terminal acid group. In one certain embodiment, a suitable A-B diblock copolymer surfactant of poly(ethylene glycol) methyl ether and poly(lactic acid) that contains a terminal acid group may be prepared as illustrated below:

Exemplary Reaction No. 4

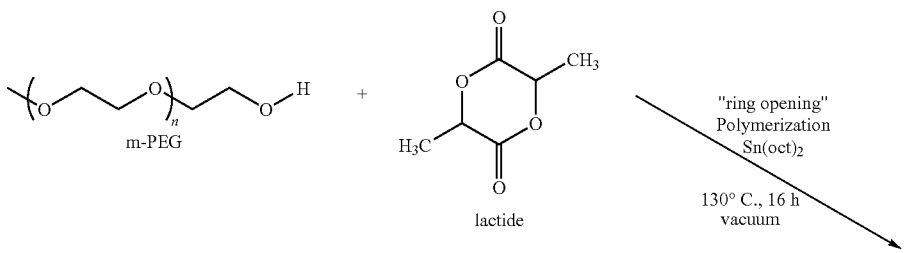

-continued
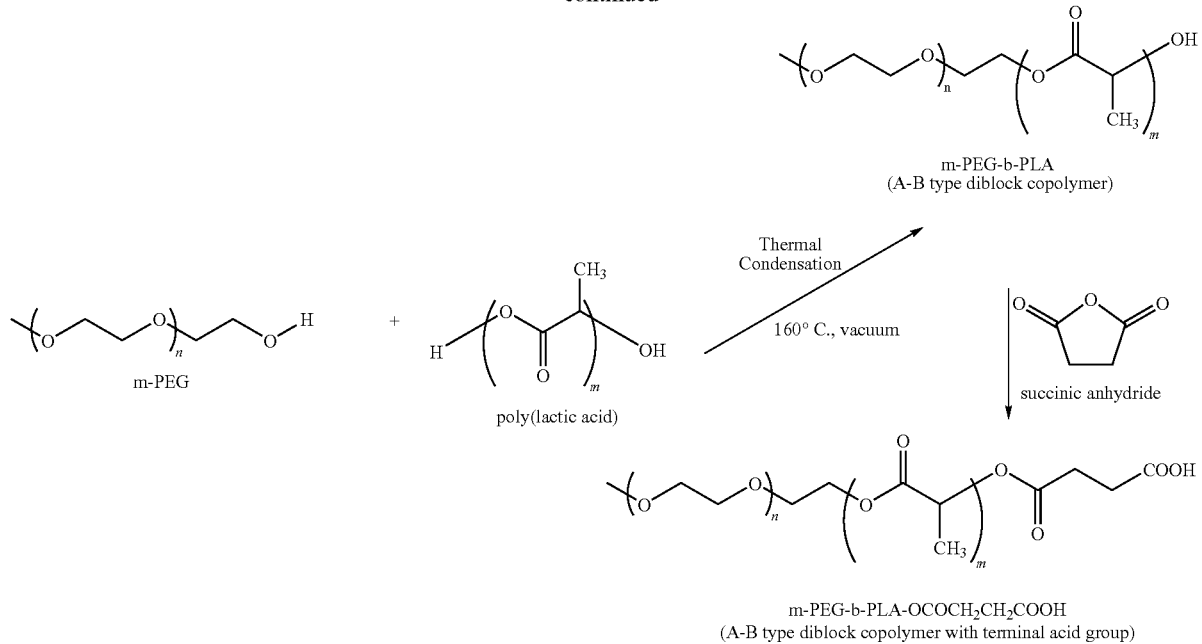
Similarly, in another embodiment, a suitable B-A-B triblock copolymer surfactant of poly(ethylene glycol) and poly(ε-caprolactone) that contains a terminal acid group may be prepared as illustrated below.
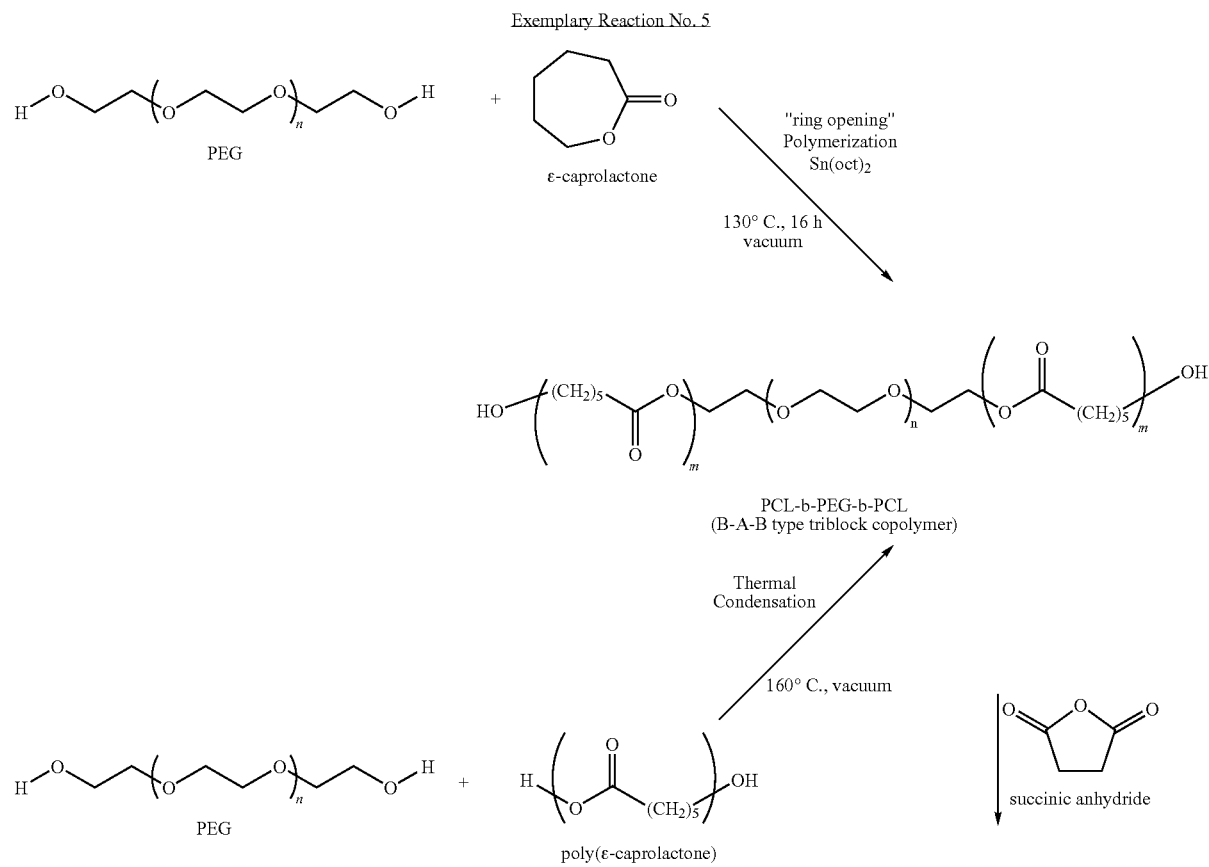

-continued

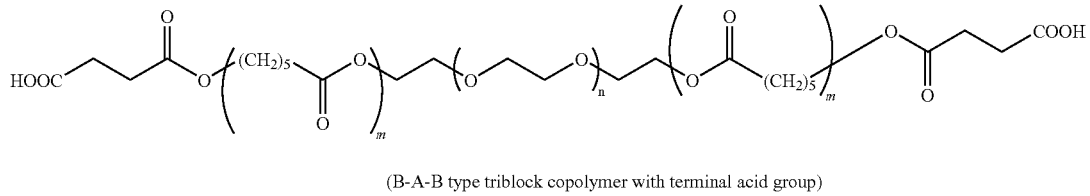

(B-A-B type triblock copolymer with terminal acid group)

In another embodiment, a suitable graft copolymer surfactant that comprises a guar backbone having branches of poly (ε-caprolactone) along its length may be prepared as illustrated below:

Exemplary Reaction No. 6

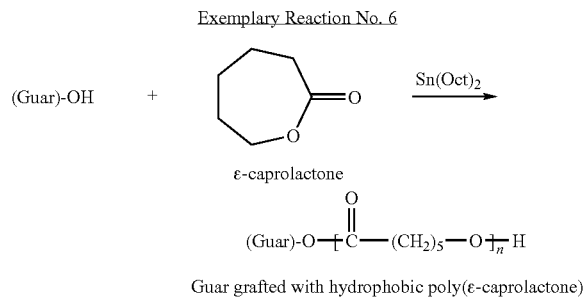

Guar grafted with hydrophobic poly(ε-caprolactone)

III. Treatment Fluids of the Present Invention

The treatments fluids of the present invention generally may comprise an aqueous fluid and a degradable surfactant. As used herein, the term "treatment fluid" refers to any fluid that may be used in a subterranean operation for a desired function and/or a desired purpose. The term "treatment fluid" does not imply any particular action by the fluid or any particular component thereof. These treatment fluids may include aqueous fluids, aqueous gels, viscoelastic surfactant gels, oil gels, foamed gels, and emulsions (e.g., W/O or O/W). Upon degradation, the degradable surfactants may release a desirable degradation product, such as an acid that may be used to break the treatment fluid of the present invention or another viscosified treatment fluid, degrade an acid-soluble component present in the subterranean formation, to facilitate the setting of an acid-settable resin, or any other suitable function. In certain embodiments, the degradable surfactants may also be used for any of a number of other functions, such as emulsifying agents, non-emulsifying agents, foaming agents, defoaming agents, viscosifying (or gelling) agents; dispersants, wetting agents, and the like.

Suitable aqueous fluids may include, but are not limited to, freshwater, seawater, saltwater (e.g., saturated or unsaturated), and brines. Those of ordinary skill in the art will appreciate that an oil gel contains a small quantity of an aqueous fluid, for example in an amount less than about 1% by weight. The aqueous fluid may be from any source, provided that it does not adversely affect the stability of the treatment fluids of the present invention.

Selection of an appropriate degradable surfactant to use for a particular application will be based on a number of factors, including the acid that will be generated, the desired degradation rate, desired function, and environmental conditions in the well bore, such as temperature, pH, and the amount of water present. For example, where the acid will be used to break the treatment fluid of the present invention or another viscosified treatment fluid present in the subterranean formation, the acid released by the degradable surfactant may provide a relatively fast break or a relatively slow break, depending on, for example, the particular degradable surfactant chosen. In some embodiments, the degradable surfactant may degrade at a delayed rate to produce an acid that may cause a relatively controlled or delayed reduction in viscosity of the treatment fluid. In choosing the appropriate degradable surfactant, one should also consider the acid that will be produced in the context of the treatment fluid of the present invention. Among other things, the acid should not adversely affect other components or operations. One of ordinary skill in the art with the benefit of this disclosure will be able to select a suitable degradable surfactant for the particular application.

The appropriate amount of the degradable surfactant to include in the treatment fluids of the present invention will vary depending upon the particular application. For example, in certain embodiments, the degradable surfactant should be included in a treatment fluid of the present invention in an amount sufficient to generate a suitable amount of acid to reduce the viscosity of the treatment fluid or another viscosified treatment fluid, to degrade an acid-soluble component present in the subterranean formation, and/or to facilitate the setting of an acid-settable resin. In certain embodiments, the degradable surfactant of the present invention is present in the treatment fluids of the present invention in an amount in the range of from about 0.01% to about 40% by weight of the treatment fluid. In certain embodiments, the degradable surfactant of the present invention is present in the treatment fluids of the present invention in an amount in the range of from about 0.1% to about 5% by weight of the treatment fluid. One of ordinary skill in the art, with the benefit of this disclosure, will be able to determine the appropriate amount of the degradable surfactant to include in the treatments fluids for a particular application.

In certain embodiments, the treatment fluids of the present invention may further comprise a gelling agent. The increased viscosity of the gelled and/or crosslinked treatment fluid may reduce fluid loss from the treatment fluid of the present invention and/or allow the treatment fluid to carry particulates (e.g., proppant or gravel particulates). Suitable gelling agents typically comprise polymers, synthetic polymers, or combinations thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091, the entire disclosure of which is incorporated herein by reference. Suitable gelling agents generally are present in the treatment fluids of the present invention in an amount in the range of from about 0.01% to about 5% by weight of the water therein. In certain exemplary embodiments, the gelling agents are present in the viscosified treatment fluids of the present invention in an amount in the range of from about 0.1% to about 2% by weight of the water therein.

Crosslinking agents may be used to crosslink gelling agent molecules to form crosslinked gelling agents. Crosslinking agents typically comprise at least one ion that is capable of crosslinking at least two gelling agent molecules. Examples of suitable crosslinking agents include, but are not limited to, boric acid, disodium octaborate tetrahydrate, sodium diborate, pentaborates, ulexite and colemanite, compounds that can supply zirconium IV ions (such as, for example, zirconium lactate, zirconium lactate triethanolamine, zirconium carbonate, zirconium acetylacetonate, zirconium malate, zirconium citrate, and zirconium diisopropylamine lactate); compounds that can supply titanium IV ions (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or combinations thereof. An example of a suitable commercially available zirconium-based crosslinking agent is "CL-24" available from Halliburton Energy Services, Inc., Duncan, Oklahoma. An example of a suitable commercially available titanium-based crosslinking agent is "CL-39" available from Halliburton Energy Services, Inc., Duncan Oklahoma. Suitable crosslinking agents generally are present in the viscosified treatment fluids of the present invention in an amount sufficient to provide, inter alia, the desired degree of crosslinking between gelling agent molecules. In certain embodiments of the present invention, the crosslinking agents may be present in an amount in the range from about 0.001% to about 10% by weight of the water in the fracturing fluid. In certain embodiments of the present invention, the crosslinking agents may be present in the viscosified treatment fluids of the present invention in an amount in the range from about 0.01% to about 1% by weight of the water therein. Individuals skilled in the art, with the benefit of this disclosure, will recognize the exact type and amount of crosslinking agent to use depending on factors such as the specific gelling agent, desired viscosity, and formation conditions.

The treatment fluids of the present invention optionally may comprise particulates, such as proppant particulates or gravel particulates. Particulates suitable for use in the present invention may comprise any material suitable for use in subterranean operations. Suitable materials for these particulates include, but are not limited to, sand, bauxite, ceramic materials, glass materials, polymer materials, TEFLON® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, metasilicate, calcium silicate, kaolin, talc, zirconia, boron, fly ash, hollow glass microspheres, solid glass, and combinations thereof. The particulate size generally may range from about 2 mesh to about 400 mesh on the U.S. Sieve Series; however, in certain circumstances, other sizes may be desired and will be entirely suitable for practice of the present invention. In particular embodiments, preferred particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. In certain embodiments, the particulates may be present in the treatment fluids of the present invention in an amount in the range of from about 2 pounds per gallon ("ppg") to about 30 ppg.

Where present, in certain embodiments, the particulates may be at least partially coated with the degradable surfactant. In certain embodiments, where a degradable surfactant is included in the treatment fluids of the present invention, at least a portion of the degradable surfactant should adsorb onto surfaces of at least a substantial portion of the particulates. For example, at least a portion of a cationic degradable surfactant should adsorb onto silicate-based surfaces, such as sand. The amount of the degradable surfactant that should adsorb onto the particulates depends on a number of factors including the particular degradable surfactant use, the particulate used, and the presence of other components that may compete with the degradable surfactant for the surface of the particulate. In some embodiments, adsorption of the surfactant onto the surface of the particulate may provide a particulate having a surface that is temporarily water-wet or oil-wet, depending on the particular degradable surfactant used and the type of particulate used. For example, a cationic surfactant may adsorb onto the surface of sand, thereby providing a surface that is temporarily oil wet so that upon degradation of the degradable surfactant the surface of the particulates may be water wet.

Optionally, the treatment fluids of the present invention may further comprise a variety of additives, such as gel stabilizers, fluid loss control additives, loss circulation materials, clay stabilizers, bactericides, combinations thereof, and the like.

IV. Exemplary Methods of the Present Invention

Upon degradation, the degradable surfactants should release a degradation product, such as an acid, that may be used in any suitable subterranean operation. For example, the acid may be used to break a viscosified treatment fluid, degrade an acid-soluble component present in the subterranean formation, to activate an oxidizer, to provide a particulate surface that is temporarily oil wet or water wet, and/or to facilitate the setting of an acid-settable resin. In certain embodiments, the degradable surfactants may also be used for any of a number of other functions, such as emulsifying agents, non-emulsifying agents, foaming agents, defoaming agents, viscosifying (or gelling) agents, dispersants, wetting agents, and the like.

In certain embodiments, the degradable surfactants may be used in a method for generating an acid downhole. Such a method may comprise providing a degradable surfactant; introducing the degradable surfactant into a well bore that penetrates a subterranean formation; and allowing at least a portion of the degradable surfactant to degrade, thereby releasing an acid. The degradable surfactants may be introduced into the subterranean formation in a treatment fluid of the present invention. The acid release by the degradable surfactant may be useful for any of a number of functions, including but not limited to, breaking a viscosified treatment fluid, degrading an acid-soluble component present in the subterranean formation, activating an oxidizer, and/or to facilitate the setting of an acid-settable resin, such as furan and phenolic resins. In certain embodiments, an acid-settable resin may be contacted by the acid, thereby facilitating the setting of the acid-settable resin. The use of acids to facilitate the setting of acid-settable resins is described in U.S. Pat. No. 4,034,811, the entire disclosure of which is incorporated herein by reference. In some embodiments, the acid may lower the pH of the treatment fluid so that an oxidizer (e.g., sodium chlorite) present in the treatment fluid is activated, for example, to break the backbone of gelling agents present in the treatment fluid (e.g., guar, starch, xanthan, etc.).

In certain embodiments, the degradable surfactants of the present invention may be used to break a viscosified treatment fluid. Such a method may comprise providing a degradable surfactant; allowing at least a portion of the degradable surfactant to degrade, thereby releasing an acid; and contacting the viscosified treatment fluid with the acid, wherein the acid reduces the viscosity of the viscosified treatment fluid. In some embodiments, the degradable surfactant may be present in the viscosified treatment fluid, such that viscosified treatment fluid is a treatment fluid of the present invention. In another embodiment, the degradable surfactant may be included in a treatment fluid of the present invention that contacts the viscosified treatment fluid subsequent to the introduction of the viscosified treatment fluid into the subterranean formation.

The viscosified treatment fluid that may be broken utilizing the degradable surfactant may be any viscosified treatment fluid that experiences a reduction in viscosity due to interaction with an acid, such as due to a reduction in pH, breaking down the backbone of the gelling agent, and/or breaking the crosslinks in the treatment fluid. These may include, but are not limited to, aqueous gels, viscoelastic surfactant gels, oil gels, foamed gels and emulsions. Suitable aqueous gels are generally comprised of an aqueous fluid, a gelling agent, and an optional crosslinking agent, while suitable emulsions are generally comprised of an aqueous phase (e.g., water or a brine) and a nonaqueous phase (e.g., a hydrocarbon). Suitable foamed gels are generally comprised of an aqueous fluid, a gelling agent, a foaming surfactant, and a gas. Suitable viscoelastic surfactant gels are generally comprises of an aqueous fluid and a viscoelastic surfactant. Suitable oil gels are generally comprised of an organic phase (e.g., diesel, hydrocarbon, etc), a surfactant molecule containing a crosslinkable group, a crosslinker.

In certain embodiments, the degradable surfactants of the present invention may be useful for degrading an acid-soluble component that is present in a subterranean formation. Such methods may comprise providing a degradable surfactant; introducing the degradable surfactant into the subterranean formation; allowing at least a portion of the degradable surfactant to degrade, thereby releasing an acid; and contacting the acid-soluble component with the acid so that the acid facilitates the degradation of the acid-soluble component. The acid-soluble component may be any acid-soluble component present within the subterranean formation, including, but not limited to, a portion of the formation itself, calcium carbonate, a component of a filter cake, and/or an acid-soluble component of a tool (e.g., completion equipment, such as plugs, sleeves, or the like). In certain embodiments, the acid-soluble component may be present in a filter cake or be adjacent thereto, such as the formation itself. In certain embodiments, the acid-soluble component may be the formation itself, for example, in matrix or fracture acidizing treatments. An example of a suitable acidizing treatment may comprise providing a treatment fluid comprising an aqueous fluid and a degradable surfactant; introducing the treatment fluid into a well bore that penetrates a subterranean formation; allowing at least a portion of the degradable surfactant to degrade, thereby releasing an acid; and contacting at least a portion of the subterranean formation with the acid. In certain embodiments, the treatment fluid may be introduced into the well bore at or above a pressure sufficient to create or enhance one or more fractures in the subterranean formation.

To facilitate a better understanding of the present invention, the following examples of certain aspects of some embodiments are given. In no way should the following examples be read to limit, or define, the scope of the invention.

EXAMPLE 1

Samples of degradable block copolymer surfactants comprising a hydrophilic A block and an aliphatic polyester B block were synthesized using known literature procedures.

Polymerization of a monomethoxypolyethylene glycol-poly(lactide) (mPEG-b-PLA) block copolymer (A-B type) was performed according to the following procedure. Poly (ethylene glycol) methyl ether (Mn: 5000 Daltons) in an amount of 10 grams was introduced into a flame-dried 100 mL two-neck round-bottomed flask, and dehydrated by heating in an oil bath to 130° C. under reduced pressure (1 mL Hg) for 2 hours. The reaction flask was filled with argon and crystallized lactide (10.08 g, 0.07 mol) was added to the flask. The mixture was stirred for 30 minutes with a magnetic stirrer. To this mixture was injected stannous octoate (0.28 g, 0.7 mmol) in 0.3 mL of dry toluene. The mixture was stirred for 10 minutes, and a vacuum was applied to remove the toluene. After the toluene's removal, the mixture was heated under argon at 130° C. for 16 hours. The polymer formed upon cooling was dissolved in dichloromethane (125 mL) and ether was added to precipitate the polymer. The precipitate obtained was filtered and dried in a vacuum oven for 48 hours to afford 18 grams of Copolymer Surfactant No. 1. The mPEG-b-PLA copolymer obtained had a number average molecular weight of 5000-5000 Daltons.

Additional samples of mPEG-b-PLA copolymers were prepared utilizing the above procedures. To obtain samples with varying molecular weights and block length of the hydrophobe, the mole ratio of crystallized lactide to the monomethoxypolyethylene glycol were varied to control the length of the hydrophobic (B block) so as to provide a series of polymers. Accordingly, Copolymer Surfactant No. 2 was an mPEG-b-PLA block copolymer having a number average molecular weight of 5000-3000 Daltons. Copolymer Surfactant No. 3 was an mPEG-b-PLA block copolymer having a number average molecular weight of 5000-1500 Daltons. Copolymer Surfactant No. 4 was an mPEG-b-PLA block copolymer having a number average molecular weight of 350-2000 Daltons. And Copolymer Surfactant No. 5 was an mPEG-b-PLA block copolymer having a number average molecular weight of 5000-15000 Daltons.

Additionally, polymerization of a monomethoxypolyethylene glycol-poly(ε-caprolactone) (mPEG-b-PCL) block copolymer (A-B type) also was performed according to the above procedure. However, instead of lactide, ε-caprolactone was used. Accordingly, Copolymer Surfactant No. 6 was an mPEG-b-PCL copolymer having a number average molecular weight of 350-1,500 Daltons. And Copolymer Surfactant No. 7 was an mPEG-b-PCL copolymer having a number average molecular weight of 350-1500 Daltons.

The samples that were synthesized according to the above procedures are shown below in Table 1.

TABLE 1

Sample Degradable Block Copolymer Surfactants

| Sample | Block Copolymer | Mn (Daltons) |
|---|---|---|
| Copolymer Surfactant No. 1 | mPEG-b-PLA | 5000-5000 |
| Copolymer Surfactant No. 2 | mPEG-b-PLA | 5000-3000 |
| Copolymer Surfactant No. 3 | mPEG-b-PLA | 5000-1500 |
| Copolymer Surfactant No. 4 | mPEG-b-PLA | 350-2000 |
| Copolymer Surfactant No. 5 | mPEG-b-PLA | 2000-5000 |
| Copolymer Surfactant No. 6 | mPEG-b-PCL | 350-1500 |
| Copolymer Surfactant No. 7 | mPEG-b-PCL | 350-2000 |

EXAMPLE 2

Emulsions were prepared utilizing the sample copolymer surfactants that were prepared in Example 1. Copolymer Surfactant No. 1 in an amount of 2 grams was dissolved in 25 mL of water. To this solution, 96 mL of dodecane was added and the resulting solution was stirred with a mixer (Silverson L4RT-W) for about 1 minute. An O/W emulsion was observed to have formed that stuck to the propeller of the mixer. After mixing, to test the emulsion, it was dropped into a beaker that contained water and dodecane, as separate phases. The gel dispersed in the water but not in the dodecane, confirming an O/W emulsion. Furthermore, this emulsion was stable at room temperature for multiple days. The emulsion was heated to 80° C. After four hours at this temperature, a portion of the dodecane separated and complete separation of the two phases was observed after 24 hours. According to the above procedure, O/W emulsions were also formed utilizing 1 gram of Copolymer Surfactants Nos. 2 and 3, respectively.

W/O emulsions were also prepared utilizing Copolymer Surfactant No. 6 that was prepared in Example 1. Copolymer Surfactant No. 6 in an amount of 1 gram was dissolved in a 10 mL mixture that comprises toulene and dodecane in a 1:1 ratio by weight. To this solution, 30 mL of water was added, and the resulting solution was stirred with the mixer for about 1 minute to form a W/O emulsion.

Therefore, Example 2 indicates that degradable surfactants of the present invention comprising a block copolymer comprising an aliphatic polyester portion and a hydrophilic portion may be used to form stable emulsions.

EXAMPLE 3

Foams were prepared utilizing the copolymers that were prepared in Example 1. Copolymer Surfactant No. 1 in an amount of 1.8 grams was dissolved in 800 grams of water. The resulting solution was stirred in a foam blender for 2 minutes to form a foam. The foamed solution was poured into a beaker and allowed to settle. The foam completely disappeared in 2 hours. To determine tolerance to calcium ions, 2 grams of calcium chloride was then added to the sample. After the addition of the calcium chloride, the solution was stirred in the foam blender for two minutes. The solution containing calcium chloride foamed. Foams were also prepared using Copolymer Surfactants Nos. 2, 3, 5, and 6.

Accordingly, Example 3 indicates that degradable surfactants of the present invention comprising a block copolymer comprising an aliphatic polyester portion and a hydrophilic portion may be used to form foams and addition of calcium ions did not impact adversely impact foaming.

EXAMPLE 4

The following example was performed to determine the water drainage from a foam prepared using Copolymer Surfactant No. 2 that was prepared in Example 1. For this example, Copolymer Surfactant No. 2 in an amount of 1 gram was dissolved in 500 mL of water. The resulting solution was stirred in a jar at 12,000 rpm to form a foam. The resulting foam was then transferred to a 1-liter graduated cylinder, and the drainage of water at the bottom of the graduated cylinder was measured for a period of 10 minutes. The above procedure was repeated utilizing PLURONIC® F108, an ethylene oxide-propylene oxide-ethylene oxide block copolymer that is commercially available from BASF Corporation, Florham Park, N.J. The results of Example 4 are shown below in Table 2.

TABLE 2

Foam Water Drainage

| Time (min) | Water Drainage (mL): Copolymer Surfactant No. 2 Foam | Water Drainage (mL): PLURONIC ® F108 Foam |
|---|---|---|
| 1 | 80 | 50 |
| 2 | 150 | 120 |
| 3 | 250 | 170 |
| 4 | 380 | 320 |
| 5 | 400 | 345 |
| 6 | 410 | 360 |
| 7 | 422 | 375 |
| 8 | 430 | 385 |
| 9 | 438 | 395 |
| 10 | 445 | 402 |

Accordingly, Example 4 indicates that degradable surfactants of the present invention comprising a block copolymer comprising an aliphatic polyester portion and a hydrophilic portion may be used to form foams.

EXAMPLE 5

Two sample fluids were prepared to illustrate the acid generated by the sample copolymer surfactants prepared in Example 1 and their reaction with calcium carbonate. These two sample fluids are shown in Table 3 and were prepared using the following procedure. In a suitable flask, a quantity of water was added. Next, a sample copolymer surfactant was Added to the flask. Copolymer Surfactant No. 5 was added to Sample Fluid No. 1, and Copolymer Surfactant No. 1 was added to Sample Fluid No. 2. Then the resultant mixture was Mixed with HTM™ gelling agent, a guar-based gelling agent that is commercially available from Halliburton Energy Services, Duncan, Oklahoma. While continuing to stir, calcium carbonate Was added to the flask. Finally, sodium tetraborate was added to the flask.

TABLE 3

Sample Composition

| Component | Sample 1 | Sample 2 |
|---|---|---|
| Water (mL) | 79 | 79 |
| Copolymer Surfactant No. 1 (g): mPEG-b-PLA (Mn 5000-5000) | — | 5.6 |
| Copolymer Surfactant No. 5 (g): mPEG-b-PLA (Mn 2000-5000) | 4 | — |
| HMP ™ Gelling Agent (mL) | 20 | 20 |
| Calcium Carbonate (g) | 2 | 2 |
| Sodium Tetraborate (mL) | 1 | 2 |

Once prepared, each sample fluid was heated to a temperature of 160° F. The $CO_2$ gas generation was then monitored to observe the extent of calcium carbonate Degradation with time. As shown in Table 4, the sample copolymer (Copolymer No 1 in Sample Fluid No. 2) containing a larger hydrophilic group (PEG) group hydrolyzes more quickly than the sample copolymer (Copolymer No 5 in Sample Fluid No. 1) to generate an acid.

Table 4 illustrates the results for each sample.

TABLE 4

$CO_2$ Gas Generation

| | $CO_2$ Volume (mL) | |
|---|---|---|
| Time (hr) | Sample 1 | Sample 2 |
| 0 | 0 | 0 |
| 5 | 20 | 55 |
| 10 | 42 | 68 |
| 15 | 68 | 104 |
| 20 | 90 | 118 |
| 25 | 100 | — |
| 30 | 118 | — |

Therefore, Example 5 indicates that degradable surfactants of the present invention comprising a block copolymer comprising an aliphatic polyester portion and a hydrophilic portion may be suitable for generating an acid that is capable of degrading acid-soluble components, such as calcium carbonate.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method of generating an acid downhole comprising:
   providing a degradable surfactant that comprises a backbone of repeating units of degradable groups;
   introducing the degradable surfactant into a well bore that penetrates a subterranean formation; and
   allowing at least a portion of the degradable surfactant to degrade, thereby releasing an acid.

2. The method of claim 1 wherein the degradable surfactant comprises a degradable block copolymer surfactant that comprises a hydrophilic polymeric block and a hydrophobic degradable polymeric block.

3. The method of claim 2 the hydrophilic polymeric block has a number average molecular weight in the range of from about 50 Daltons to about 6,000,000 Daltons, and the hydrophobic degradable polymeric block has a number average molecular weight in the range of from about 500 Daltons to about 20,000 Daltons.

4. The method of claim 2 wherein the degradable block copolymer surfactant comprises a hydrophilic polymeric backbone grafted with a polylactic acid or a poly(caprolactone).

5. The method of claim 2 wherein the hydrophilic polymeric block comprises at least one hydrophilic polymer selected from the group consisting of: a poly(alkylene glycol); a poly(alcohol); poly(vinyl pyrrolidone); a polysaccharide; a chitin; a chitosan; a protein; a poly(amino acid); a poly(alkylene oxide); a poly(amide); a poly(acid); a polyol; copolymers thereof and a combination thereof.

6. The method of claim 2 wherein the hydrophobic degradable polymeric block comprises at least one hydrophobic polymer selected from the group consisting of: a polyester, a poly(anhydride), a poly(orthoester), a poly(lactic acid), a poly(glycolic acid), a poly(caprolactone), a poly(hydroxybutyrate), a polyether ester, a polyester amide, a polyester carbonate, a polyester urethane, a polydioxanone, copolymers thereof, and a combination thereof.

7. The method of claim 2 wherein the degradable block copolymer surfactant comprises a group selected from the group consisting of: a terminal acid group; an alcohol group; an amine group; and a tertiary amine group.

8. The method of claim 2 wherein the degradable block copolymer surfactant is a quaternary ammonium degradable block copolymer salt.

9. The method of claim 1 wherein the degradable surfactant comprises a block copolymer of an aliphatic polyester and a hydrophilic polymer selected from the group consisting of a poly(alkylene glycol) and a poly(alkylene oxide).

10. The method of claim 1 wherein the degradable surfactant comprises a block copolymer of a hydrophilic polymer selected from the group consisting of a polyethylene oxide and a polyethylene glycol, and a hydrophobic polymer selected from the group consisting of a poly(caprolactone) and a poly(lactic acid).

11. The method of claim 1 wherein the degradable surfactant comprises a backbone that comprises at least one degradable group selected from the group consisting of: an ester, an anhydride, an acetal, an orthoester, an esteramide, a ester ether, an ester carbonate, an ester urethane, and a combination thereof.

12. The method of claim 1 wherein the degradable surfactant is a quaternary amine cationic surfactant.

13. The method of claim 1 wherein the degradable surfactant comprises a group selected from the group consisting of:

a non-ionic group; a cationic group; an anionic group; an amphoteric group; and a zwitterionic group.

14. The method of claim 1 wherein the degradable surfactant comprises a hydrophobic polymer selected from the group consisting of a poly(lactic) acid and a poly(caprolactone), the hydrophobic polymer having a head group that comprises a salt of a carboxylic acid.

15. The method of claim 1 wherein at least a portion of the degradable surfactant has the following formula:

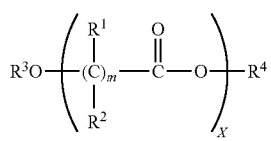

wherein $R^1$ is a hydrogen, an alkyl, an aryl, an alkylaryl, an acetyl, or a heteroatom; $R^2$ is a hydrogen, an alkyl, an aryl, an alkylaryl, an acetyl, or a heteroatom, $R^3$ is a hydrogen, an alkyl, an aryl, an alkylaryl, an acetyl, an alkoxyl, a benzoyl, a heteroatom or a group comprising an anionic group, a cationic group, or a non-ionic group; $R^4$ is a H, a Na, a K, or a Li, or a group comprising an anionic group, a cationic group, or a non-ionic group; m is an integer between 1 and 20; and X is an integer between 2 and 100.

16. The method of claim 1 wherein the step of introducing the degradable surfactant into the subterranean formation comprises introducing a treatment fluid comprising an aqueous liquid and the degradable surfactant into the subterranean formation.

17. The method of claim 16 wherein the treatment fluid further comprises particulates.

18. The method of claim 17 wherein at least a portion of the degradable surfactant is adsorbed onto a surface of at least a substantial portion of the particulates to make the surface water wet or oil wet after the adsorption of the degradable surfactant thereon.

19. The method of claim 18 wherein the degradable surfactant is a cationic surfactant that makes the surface oil wet after the adsorption of the degradable surfactant thereon.

20. The method of claim 16 wherein the degradable surfactant is dissolved in the aqueous liquid, prior to the introduction of the treatment fluid into the subterranean formation.

21. The method of claim 1 wherein the acid facilitates a reduction in viscosity of a viscosified treatment fluid, degrades an acid-soluble component present in the subterranean formation, activates an oxidizer, facilitates the setting of an acid-settable resin, or combinations thereof.

22. A method of reducing the viscosity of a viscosified treatment fluid comprising:
providing a degradable surfactant that comprises a backbone of repeating units of degradable groups;
allowing at least a portion of the degradable surfactant to degrade, thereby releasing an acid; and
contacting the viscosified treatment fluid with the acid, wherein the acid reduces the viscosity of the viscosified treatment fluid.

23. The method of claim 22 wherein the degradable surfactant comprises a degradable block copolymer surfactant that comprises a hydrophilic polymeric block and a hydrophobic degradable polymeric block.

24. The method of claim 22 wherein the degradable surfactant comprises a block copolymer of an aliphatic polyester and a hydrophilic polymer selected from the group consisting of a poly(alkylene glycol) and a poly(alkylene oxide).

25. The method of claim 22 wherein the degradable surfactant comprises a backbone that comprises at least one degradable group selected from the group consisting an ester, an anhydride, an acetal, an orthoester, an esteramide, a ester ether, an ester carbonate, an ester urethane and a combination thereof.

26. The method of claim 22 wherein the degradable surfactant is present in the viscosified treatment fluid.

27. A method of degrading an acid-soluble component present within a subterranean formation comprising:
providing a degradable surfactant that comprises a backbone of repeating units of degradable groups;
introducing the degradable surfactant into the subterranean formation;
allowing at least a portion of the degradable surfactant to degrade, thereby releasing an acid; and
contacting the acid-soluble component with the acid so that the acid facilitates the degradation of the acid-soluble component.

28. The method of claim 27 wherein the acid-soluble component is selected from the group consisting of a portion of the subterranean formation, calcium carbonate, a component of a filter cake, a component of a tool, and a combination thereof.

29. The method of claim 27 wherein the degradable surfactant comprises a degradable block copolymer surfactant that comprises a hydrophilic polymeric block and a hydrophobic degradable polymeric block.

30. The method of claim 27 wherein the degradable surfactant comprises a block copolymer of an aliphatic polyester and a hydrophilic polymer selected from the group consisting of a poly(alkylene glycol) and a poly(alkylene oxide).

31. The method of claim 27 wherein the step of introducing the degradable surfactant into the subterranean formation comprises introducing a treatment fluid comprising an aqueous liquid and the degradable surfactant into the subterranean formation.

32. The method of claim 31 wherein the treatment fluid is introduced into the subterranean formation at or above a pressure sufficient to create or enhance one or more fractures in the subterranean formation.

33. The method of claim 31 wherein the degradable surfactant is dissolved in the aqueous liquid, prior to the introduction of the treatment fluid into the subterranean formation.

* * * * *